United States Patent [19]

Sakata et al.

[11] Patent Number: 4,847,703
[45] Date of Patent: Jul. 11, 1989

[54] DATA TRANSMISSION AND DETECTION SYSTEM

[75] Inventors: Tsuguhide Sakata, Machida; Norio Kimura, Tokyo; Tomishige Taguchi, Urawa; Masahiro Takei, Yokohama, all of Japan

[73] Assignee: Canon Kabushiki Kaisha, Tokyo, Japan

[21] Appl. No.: 868,032

[22] Filed: May 29, 1986

[30] Foreign Application Priority Data

Jun. 3, 1985 [JP] Japan ................................ 60-120195
Jun. 19, 1985 [JP] Japan ................................ 60-133531

[51] Int. Cl.⁴ .............................................. G11B 5/09
[52] U.S. Cl. ........................................ 360/48; 360/40
[58] Field of Search ....................... 369/59, 51, 41, 40; 375/117; 370/49; 360/51, 48, 40, 32

[56] References Cited

U.S. PATENT DOCUMENTS

| 3,903,504 | 9/1975 | Rogers et al. | |
| 4,239,934 | 12/1980 | Andrew et al. | 375/117 |
| 4,255,813 | 3/1981 | Miyazaki | 375/117 |
| 4,606,056 | 8/1986 | Perloff | 375/117 |

FOREIGN PATENT DOCUMENTS

| 174807A | 3/1986 | European Pat. Off. | |
| 2275946 | 1/1976 | France | |
| 54-5313 | 1/1979 | Japan | |
| 57-130214 | 8/1982 | Japan | |
| 2080997A | 2/1982 | United Kingdom | |

OTHER PUBLICATIONS

"Asynchronous Transmission; Some Basic Bits of Data", *The Electronic Engineer*, vol. 31, No. 2.
"Externe Speicherverfahren fur Mikrocomputer", *Elektronik* vol. 27, No. 12, pp. 103-108.

*Primary Examiner*—Vincent P. Canney
*Attorney, Agent, or Firm*—Fitzpatrick, Cella, Harper & Scinto

[57] ABSTRACT

A data transmission system and apparatus used for recording on a recording medium an audio signal, compressed in time base with a predetermined compression ratio, together with a data signal for reproduction of the audio signal. The data signal is compresed of serial data of bits. A dummy bit is provided before the head bit of the serial data with the dummy bit being in inverted relation to the head bit. A detection system and apparatus for detection of the data transmitted by the data transmission system, and a recording medium on which signals are recorded according to the data transmission system are disclosed.

45 Claims, 13 Drawing Sheets

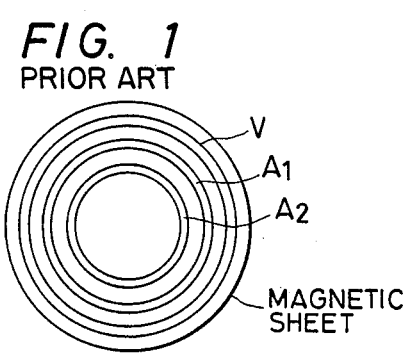
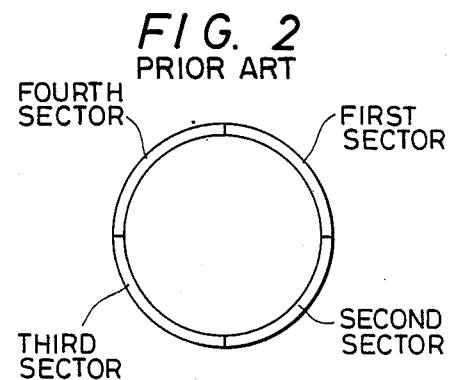
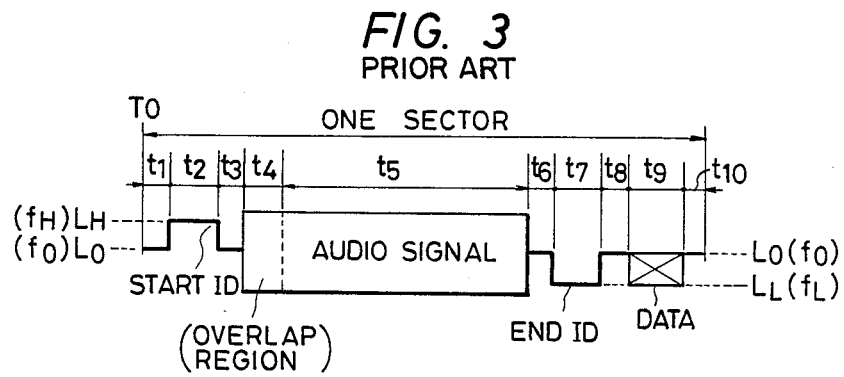

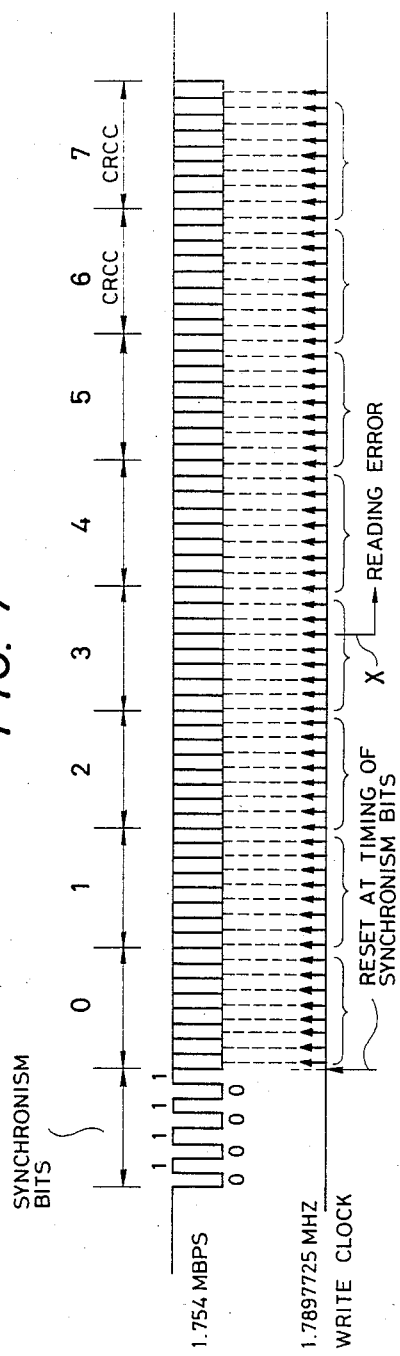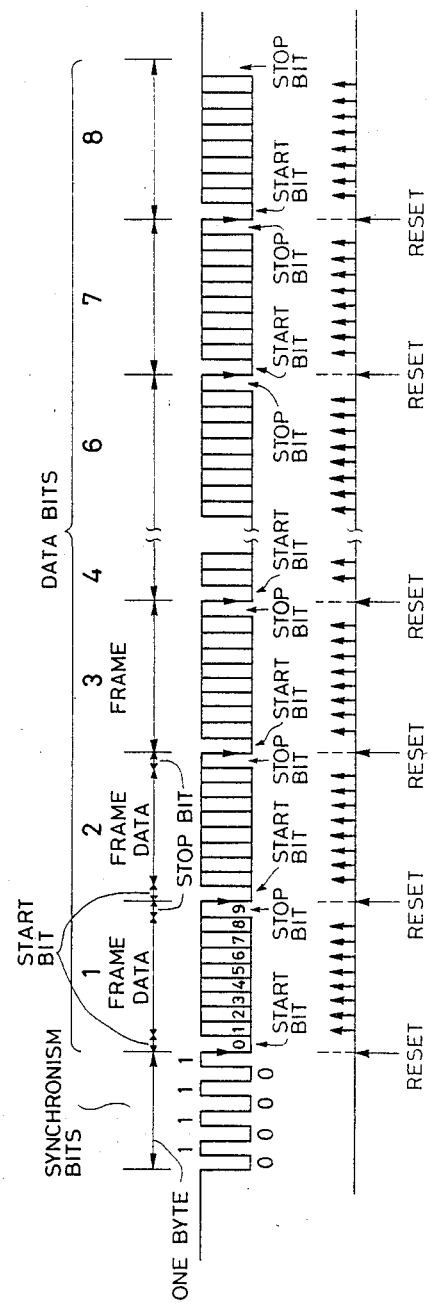

FIG. 13

(A) DATA SIGNAL (g)

(B) OUTPUT OF SYNCHRONISM DETECTOR (i)

(C) OUTPUT OF COUNTER 333 (m)

(D) OUTPUT OF DELAY CIRCUIT 102

(E) OUTPUT OF MONO-MULTI 103

(F) OUTPUT OF MONO-MULTI 104

(G) OUTPUT OF MONO-MULTI 105

(H) OUTPUT OF AND GATE 107 ($\ell$)

(I) OUTPUT OF COUNTER 332

(J) OUTPUT OF DELAY CIRCUIT 338

(K) OUTPUT OF FF 334

(L) OUTPUT OF AND GATE 336

(M) OUTPUT OF AND GATE 339 (WRITE CLOCK (j))

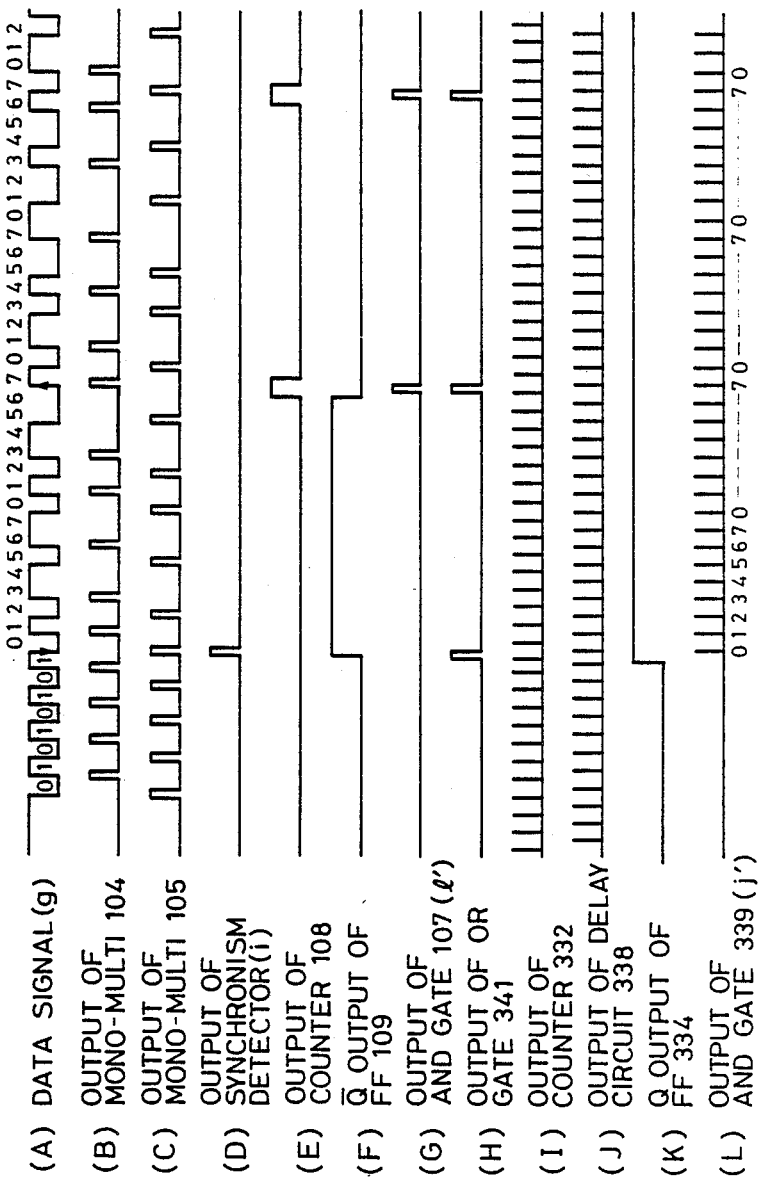

DATA TRANSMISSION AND DETECTION SYSTEM

BACKGROUND OF THE INVENTION

1. Field of the Invention

The present invention relates to data transmission and detection systems and more particularly to a system which transmits serial data of bits and a system which detects the serial data.

2. Related Background Art

In recently proposed video floppy systems, it is proposed to record a video signal as well as an audio signal on a magnetic sheet as the recording medium.

FIG. 1 diagrammatically shows both the video and audio signals present together on a magnetic sheet. For example, according to the standards on video floppies, field video signals (V) and audio signals (A1, A2) all can be recorded on a magnetic sheet for up to 50 concentric tracks in all. The audio signal is raised by time base compression into the video band and recorded in a frequency modulated form. The recording time per track is approximately 10 seconds, assuming that the audio band is 5 KHz and the time base compression ratio is 640. Also, assuming that the audio band is 2.5 MHz and the time base compression ratio is 1,280, recording for approximately 20 seconds is possible. In this case, the audio signal may be completed in a single track or extended into the next track.

The ring-like audio track is divided into four sectors, as shown in FIG. 2. For example, in the mode where recording for 10 seconds is possible, an amount of information for 2.5 seconds is allotted to each sector.

FIG. 3 illustrates the form of an audio signal and additional signals to be recorded on a single sector.

In FIG. 3, after an elapse of t1 from time $T_0$, a start ID signal having a level $L_H$ higher than a reference level $L_0$ continues for time $t_2$ for obtaining the timing to read the audio signal information. After a blank of $t_3$, the audio signal starts. During the first interval of time $t_4$ the signal on a sector overlaps with that on the just preceding sector. This does not occur in the first sector corresponding to the leading portion of the audio signal. A new audio signal is for the remaining time $t_5$, the length of which is variable; 2.5 seconds at a maximum in the mode of 10 seconds per track, as mentioned above. After a subsequent blank of $t_6$, an end ID signal having a level of $L_L$ lower than reference level $L_0$ continues for $t_7$ in order to permit detection of the end of the audio signal and to obtain the timing of reading data signal related to the subsequent audio signal. After a blank of $t_8$, the data interval continues for $t_9$. Then a blanking interval of time $t_{10}$ appears, the length of which is varied according to the interval of the preceding audio signal $t_5$, and thus one sector cycle ends. This form is basically the same in any of the sectors where the audio signal is present. The interval of the audio signal shown by $t_5$ is variable and selected so that the interval $t_5+t_{10}$ is constant at all times. Thus the length of the audio signal determines the position of the end ID and data signals.

The data signal includes, in the form of digital data, the number, on the magnetic sheet, of a track on which the audio signal is recorded, the number of the leading and subsequent tracks through which audio signals are recorded continuously, the number of the tracks through which the video signal corresponding to the audio signal is recorded, the compression ratio of the audio signal, etc. In this case, it is arranged that "1" and "0" represent levels $L_0$ and $L_L$, respectively.

When subjected to frequency modulation, the voltage levels $L_0$, $L_H$, and $L_L$ correspond to $f_0$, $f_H$ and $f_L$ modulation frequencies, respectively, where $f_L<f_0<f_H$, for example, $f_0=6$ MHz, $f_H=7$ MHz, $f_L=5$ MHz.

The above data signal will now be described in more detail.

FIG. 4 illustrates on an enlarged scale the data signal shown in FIG. 3.

In FIG. 4, reference numeral 51 denotes synchronism bits of 1 byte. Reference numerals 52-59 denote data signals of 1 byte each; all of the data signals 52-59 thus include 8 bytes in all. Of the 8-byte data for the signals 52-59, for example, 6 bytes for the signals 52-57 are used as the net data bits and 2 bytes for the remaining signals 58 and 59 are used as the CRCC (cyclic redundancy check code) for error detection. Here, the 8 bytes for the signals 52-59, inclusive of CRCC, will be described hereinafter as the "data". Thus the data signal of FIG. 4 is composed of the 1 byte of synchronism bits and the 8 byte of data bits. The type of the codes used is an NRZ code where low and high levels are represented by "0" and "1", respectively. The total number of bits used is 72. As described above, the net 6-byte data includes the track number of the audio signal tracks, the time compression ratio of the audio signal, the track number of the corresponding video, the track number of the leading and trailing tracks through which the audio signal continues, etc.

FIG. 5 shows one example of a circuit to produce the data signal of FIG. 4.

In FIG. 5, a signal generator 60 generates a start, and an end ID signals and a clock signal to read a 9-byte, (=72-bit) data shift register 63. An adder 61 adds a start ID signal and an end ID signal from signal generator 60 to a data signal from shift register 63. A selector 62 selects which of the bytes of shift register 63 should be connected to the output of a controller 12 including a microcomputer.

The operation of the FIG. 5 circuit concerning data generation will now be described. First, controller 12 controls selector 62 so that the one-byte synchronism signal and predetermined data are written into a byte area 0 (the least significant byte area) and more significant byte areas 1-8, respectively, of shift register 63 in bytes in parallel form sequentially from byte area 0 to byte area 8 (the most significant byte area). In this case, the synchronism signal of 1 byte written into the least significant byte area 0 is represented, for example, by "01010101". As described above, the net data is written into byte areas 1-6 and the CRCC into byte areas 7 and 8. When this writing has been completed, controller 12, for example, enables signal generator 60 to generate a read clock signal (a) at a predetermined timing synchronous with rotation of the magnetic sheet (the timing is, for example, determined on the basis of PG signals, etc., derived by detection of rotating phase indicia attached to part of the magnetic sheet). The clock signal (a) causes the contents of shift register 63 to be read in bit serial form sequentially from byte 0 to byte 8 and a signal train having the form of FIG. 4 is obtained at the output (b) of the register 63. This output (b) of the register is added by adder 61 to the start and end ID signals (c) from signal generator 60.

The output (d) of adder 61 is then synthesized with a compressed audio signal into a signal having the format shown in FIG. 3. The adder output is then subjected to processing including emphasis, frequency modulation, etc., and recorded on the magnetic sheet via a magnetic head. In this case, if the recording speed is 1 TV field/track, the magnetic sheet will be rotated at 3,600 rpm under the NTSC system and concentric recording tracks will be formed.

The leading bit output of shift register 63 is connected to the trailing end bit input thereof, which is not shown here. Thus in order to record data for one sector, data is circulated and written into the shift register 63 even after the data has been read out once, and when the second and subsequent sectors are to be recorded, the data will be read and recorded again and again.

Reproduction of the signal recorded in the above mentioned manner will now be described. Here, especially, reproduction of the data will be described and reproduction of the compressed audio signal, etc., will be omitted.

FIG. 6 illustrates an example of a circuit to reproduce the data. In FIG. 6, reference numeral 10 denotes a magnetic sheet. A sheet rotating motor 11 is controlled so as to rotate at 3,600 rpm in accordance with the NTSC system in view of a recording speed of 1 TV field/track. A PG detector 13 detects the rotating indicia on the sheet 10 and produces a PG signal. The circuit of FIG. 6 further includes a magnetic head 14, a reproduction preamplifier 22, a frequency demodulator 26, a deemphasis circuit 27, a voice reproduce circuit 28, an ID separator 29 which separates the start and end ID signals, a data gate pulse generator 30, a data gate 31, a data synchronism detector 32, a signal generator 33, a 8-byte data store shift register 64, and a selector 65. Shift register 64 may also be used as shift register 63 of FIG. 5.

In the above structure, the FM signal picked up by magnetic head 14 out of magnetic sheet 10 is amplified by preamplifier 22 to a predetermined level and then delivered to frequency demodulator 26. The signal demodulated by demodulator 26 is deemphasized by deemphasis circuit 27 into a signal having the format shown in FIG. 3. This signal is delivered to voice reproduce circuit 28 where the audio portion of the signal is subjected to predetermined processing and then expanded into the original signal. Thus the original audio signal is reproduced.

The reproduced signal from deemphasis circuit 27 is also delivered to ID separator 29 and data gate 31. The ID separator 29 is basically a low-pass filter, the cut-off frequency of which is set so that the ID signal can pass through the filter and that no audio and data signals can pass. The start and end ID signals (e) separated by ID separator 29 are delivered to data gate pulse generator circuit 30 which separates only the end ID signals on the basis of the PG signal output from PG detector 13 which detects the rotating indicia on the magnetic sheet 10. The data gate pulse generator 30 produces a data gate pulse (f) to extract only the data portion on the basis of one of the four end ID signals for the four sectors designated by controller 12. The data gate pulse (f) is delivered to data gate 31, which separates only the data signal (g), inclusive of the synchronism portion, from the reproduced signal having substantially the format of FIG. 3. The separated data signal (g) is then delivered to shift register 64 and data synchronism detector 32. Synchronism detector 32 detects the synchronism bits at the head of the incoming data signal such as is shown in FIG. 4 and is composed of a shift register, a counter, a logic gate, etc. This will be described in more detail hereinafter. The clock signal (h) which is input by signal generator 33 is, for example, 3 $f_{sc}$, assuming that the bit rate is $f_{sc}/2$ bits/sec (PBS), where $f_{sc}=3.579545$ MHz which is the color subcarrier frequency in the NTSC system. The counter which divides the clock signal (h) by a factor of, for example, of 6 is reset by the first rise of the synchronism bits. Each of the pulses of the 6-divided clock signal is adjusted to coincide with the central position of a respective one of the synchronism bits and the thus obtained clock pulses are applied as the write clock pulses to the 8-bit shift register to write the synchronism bits thereinto. The 8 outputs of the shift register are coupled to the logic gate which outputs, for example, "1" when the register output takes the pattern "01010101". Thus when the synchronism detector 32 detects the synchronism bits of data, it outputs a detection pulse (i) which is applied to signal generator 33. This resets another divide by 6 frequency circuit in the signal generator 33 which counts down the 3 $f_{sc}$. Thus signal generator 33 produces write clock signal (j), reset in timing, the pulses of which are applied sequentially to shift register 64. In response to these pulses the shift register writes thereon in a bit serial manner the bit data of, for example, of 8 bytes of the data signal 52-59 of FIG. 4 excluding the synchronism bits of the data signal. When signal generator 33 has generated write clock pulses for 8 bytes, it delivers a write end pulse (k) to controller 12. In response to the write end pulse the controller 12 starts to read the data from shift register 64. That is, controller 12 controls selector 65 such that same selects a respective one of the bytes of shift register 64 sequentially from the least significant byte (byte 0) to the most significant byte (7) and reads the corresponding data in a bit parallel manner. When this reading has been completed, controller 12 again controls data gate pulse generator 30 so that same produces a data gate pulse (f) corresponding to the end ID signal in another sector. This causes reading operation similar to the above to be repeated. This reading operation will end when it has been repeated for four sectors, i.e. four times.

The data transmission (recording) and detection (reproduction) system which forms the background techniques of the present invention and which has just been described, has the following problems.

Assume, that the bit rate for data recording is $f_{sc}/2$ BPS, i.e., 1.7897725 MBPS and that the rotating speed of the magnetic sheet is ideally 3,600 rpm both in recording and in reproduction. Then the read clock frequency for reproduction may be 1.7897725 MHz. However, the rotation of the, magnetic sheet may contain jitter due to nonuniform motor rotation. The center of the concentric recording tracks may be deviated from the center of rotation of the sheet due to changes in the accuracy of the sheet being plased on the motor spindle, for example, in recording and reproduction. In such a case, the resulting reproduced signal would contain jitter.

According to the inventors' experiment, the quantity of this jitter was no less than ±2% at its worst and data which had been recorded at a bit rate of 1.7897725 MBPS was reproduced at a bit rate fluctuating between 1.754 and 1.826 MBPS. In this case, the fluctuating period is 16.7 m sec corresponding to the magnetic sheet rotation speed at 3,600 rpm (60 Hz). On the other hand, the interval of each data bit is about 36 μsec (for 8 bytes, the bit rate is as short as 1.7897725 MBPS).

Thus if data is written when the bit rate has fluctuated to 1.754 MBPS, the write clock frequency at that time should be essentially 1.754 MHz. In this case, however, data signal is only present discretely at 90-degree intervals with a width of about 36 μsec on a single track, the period of which is 16.7 m sec. The type of codes used is an NRZ which itself has no clock pulse components. Therefore, it is difficult to cause the write clock signal to follow the frequency at 1.754 MHz using means such as a PLL and thus there is no method other than detection of the data, e.g., or writing of same into the shift register, using a fixed-frequency clock signal of 1.7897725 MHz which is the same as that used in recording.

FIG. 7 illustrates an example where the data having a bit rate of 1.754 MBPS is detected or written into the shift register using a write clock frequency of 1.7897725 MHz. As shown in FIG. 7, if the write clock frequency and the data bit rate are deviated 2% from each other, a read error will occur midway in the byte 3 (at the fourth byte) indicated by X in FIG. 7.

As described above, in the data recording and reproduction system described with respect to FIGS. 4–6, although the write clock is reset and synchronized by the first synchronism bit, the difference between the data rate and the write clock frequency due to jitter causes the relative phase of the write clock signal to shift from the data bit to be detected primarily to the adjacent bit midway in the data train (for example, at the portion shown by X in FIG. 7). Thus an error in reading results.

As means for eliminating this error, it could be considered to employ an asynchronous (also referred to as the "start-stop synchronism") communications system using a start and a stop bits. FIG. 8 shows one such example in which the synchronism bits are included because they are needed to distinguish between the data and a possible dropout of the record signal during reproduction and to indicate that data will begin next. Each unit data portion is composed of a frame including one start bit, 8 serial data bits and one stop bit arranged in this order (10 bits in all). Since such form of data train causes the start bit to reset the write clock, the error in reading due to jitter is reduced. That is, as shown in FIG. 8, each time an 8-bit data is read, the write clock is reset and synchronized by the next start bit so that each of the write clock pulses is substantially stably settled at substantially the center of a respective one of the data bits.

While this method alleviates the influence of jitter, it increases redundancy; for example, 10 bytes (80 bits) are needed to record 8-byte data (64 bits). That is, 16 excess code bits are added and the bit utilization measure is reduced.

While the above has been described relative to the problems with the case in which the data signal is recorded and reproduced, together with the audio signal, on and from the magnetic sheet as an example, similar problems will occur with a data signal including especially discrete data signal blocks even in recording and reproduction on and from other recording mediums such as magnetic tape, or in general data transmission and reception.

SUMMARY OF THE INVENTION

In view of the above problems, a primary object of the present invention is to provide a data transmission and a detection system which are capable of detecting each of the bit data accurately although the data bit rate may fluctuate.

Another object of the present invention is to provide a data transmission system and a data detection system of low redundancy and high bit utilization measure.

In order to attain such objects, according to a preferred embodiment of the present invention, there is disclosed a system which transmits serial data of bits with dummy bit before the head of the serial data, the dummy bit being in inverted relationship to the head bit data.

According to a preferred embodiment of the present invention, there is disclosed a serial data detection system which determines a timing to detect each bit data of serial data of bits using an inverting edge between that bit bit and dummy data provided, before the head of the serial data, the dummy bit being in inverted relationship to the head bit of the serial data.

Other objects of the present invention will be apparent from the following description of an embodiment thereof.

BRIEF DESCRIPTION OF THE DRAWINGS

FIG. 1 illustrates recording tracks on a magnetic sheet;

FIG. 2 illustrates an audio track consisting of divided sectors;

FIG. 3 illustrates the arrangement of an audio signal, an ID signal and a data signal contained in a single sector;

FIG. 7 illustrates an inconvenience occurring in the reproduction system of FIG. 6 in the case of the data signal of FIG. 4;

FIG. 8 illustrates the details of another format of the data signal which can be employed to avoid the problem illustrated in FIG. 7;

FIGS. 13A through M is a timing chart showing the inputs and outputs of main blocks of FIG. 12;

FIGS. 18A through L is a timing chart showing the inputs and outputs of main blocks of FIG. 17.

DESCRIPTION OF THE PREFERRED EMBODIMENTS

One embodiment of the present invention will be described in which the present invention is applied to recording and reproducing of the data signal as an additional signal for recording and reproducing of the audio signal described in FIGS. 1-4.

Figure 9:
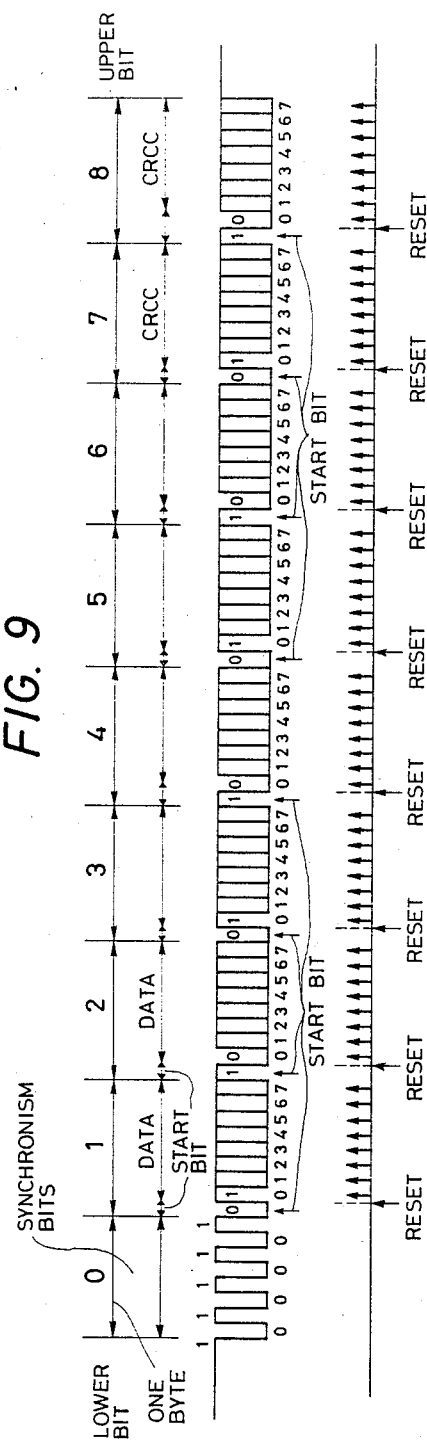
FIG. 9 illustrates one example of the format of the data signal used in an embodiment of the present invention applied to the recording and reproduction of the audio and data signals described in FIGS. 1 to 4.

FIG. 9 illustrates the format of the data signal used in the particular embodiment.

The particular embodiment of FIG. 9 is different, for example, from the example of FIG. 8 in that the former uses no stop bit, but only a start bit provided to each 1-byte data train. In this case, the start bit is provided as a dummy bit in such a manner that if the head least significant (left end) bit of a 8-bit serial data is "0", the start bit is "1" and if the head bit is "1", the start bit is "0"; i.e. inversion occurs necessarily between the start bit and the head least significant bit of the 8-bit data. This information of inversion (inversion edge) is used for resetting the clock to write data into the shift register and determining the timing of detecting each bit data.

In this case, the synchronism bits are also provided to distinguish data from possible dropout pulses and to indicate that the data will start next.

Figure 10:
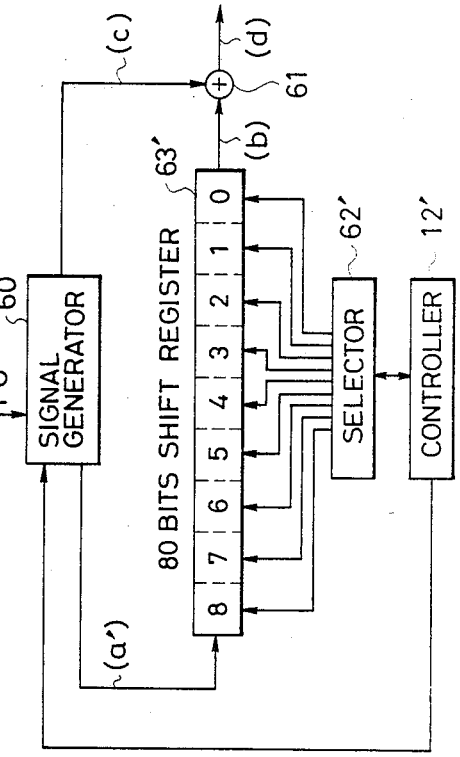
FIG. 10 is a block diagram showing one embodiment of a circuit to produce the data signal shown in FIG. 9 together with the ID signal.

FIG. 10 shows an example of a circuit to generate a data signal having the format shown in FIG. 9. Note that in FIG. 10 the same reference numeral as that in FIG. 5 denotes the same element as that in FIG. 5 and that the same reference numeral with a prime in FIG. 10 denotes an element corresponding to that of FIG. 5.

Assume that shift register 63', here, has a capacity of 80 bits and is used in 9 divided frames 0-8 for the purpose of handling data. In frame structure, only the least significant bit frame 0 contains 8 bits and other frames 1-8 each contains 9 bits. Thus controller 12' and selector 62' each have a structure compatible with these elements.

In the above structure, data is written from controller 12' into shift register 63' via selector 62' under control of controller 12'. This writing is performed, for example, in order of frame number (low to high or reversely). In this case, controller 12' controls shift register 63' and the data output from controller 12' such that same writes the 8 synchronism bits "01010101" into frame 0, each data of 9 bits in all into a respective one of frames 1-6, the 9-bit data consisting of 8-bit serial data and 1-bit dummy or start data provided before the head bit of the serial data, the dummy bit being in inverted relationship to the head bit; and each 9-bit CRCC subdata into a respective one of frames 7 and 8, the 9-bit subdata consisting of a respective one of the 8-bit halves of the 16-bit CRCC and 1-bit dummy bit provided before the head bit of that 8-bit half, the just-mentioned dummy bit being in inverted relationship to the 8-bit half head bit. Thus if the contents of shift register 63' at this time is followed sequentially from frame 0 or LSB side (right extreme in FIG. 9) to frame or MSB side, it will be seen that the data is arranged just as shown in FIG. 7.

When this writing has ended, controller 12' enables signal generator 60, in the same way as is mentioned above, to generate a write clock signal (a') at predetermined timing (determined, for example, according to the PG signal, in the same way as is mentioned above) synchronous with rotation of the magnetic sheet. These write clock pulses (a') cause the contents of shift register 63' to be read sequentially from frame 0 to frame 8 in a bit serial manner and thus the signal train having the format of FIG. 9 is obtained at the output (b) of shift register 63'. The output (b) of shift register 63' is combined at adder 61 with the start and end signals (c) from signal generator 60.

The output (d) of adder 61 is then combined with a compressed audio signal, in the same way as is mentioned above, into a signal such as is shown in FIG. 3. The signal is then subjected to processing such as emphasis and frequency modulation and then recorded on the magnetic sheet via the magnetic head.

Also in the particular embodiment, shift register 63' has its leading end bit output connected to its tail end bit input. Thus in order to record data for one sector, after data is read once, it is circulated and written again into shift register 63' and when the second and subsequent sectors are written sequentially, the same data is again and again read and used for recording.

Figure 11:
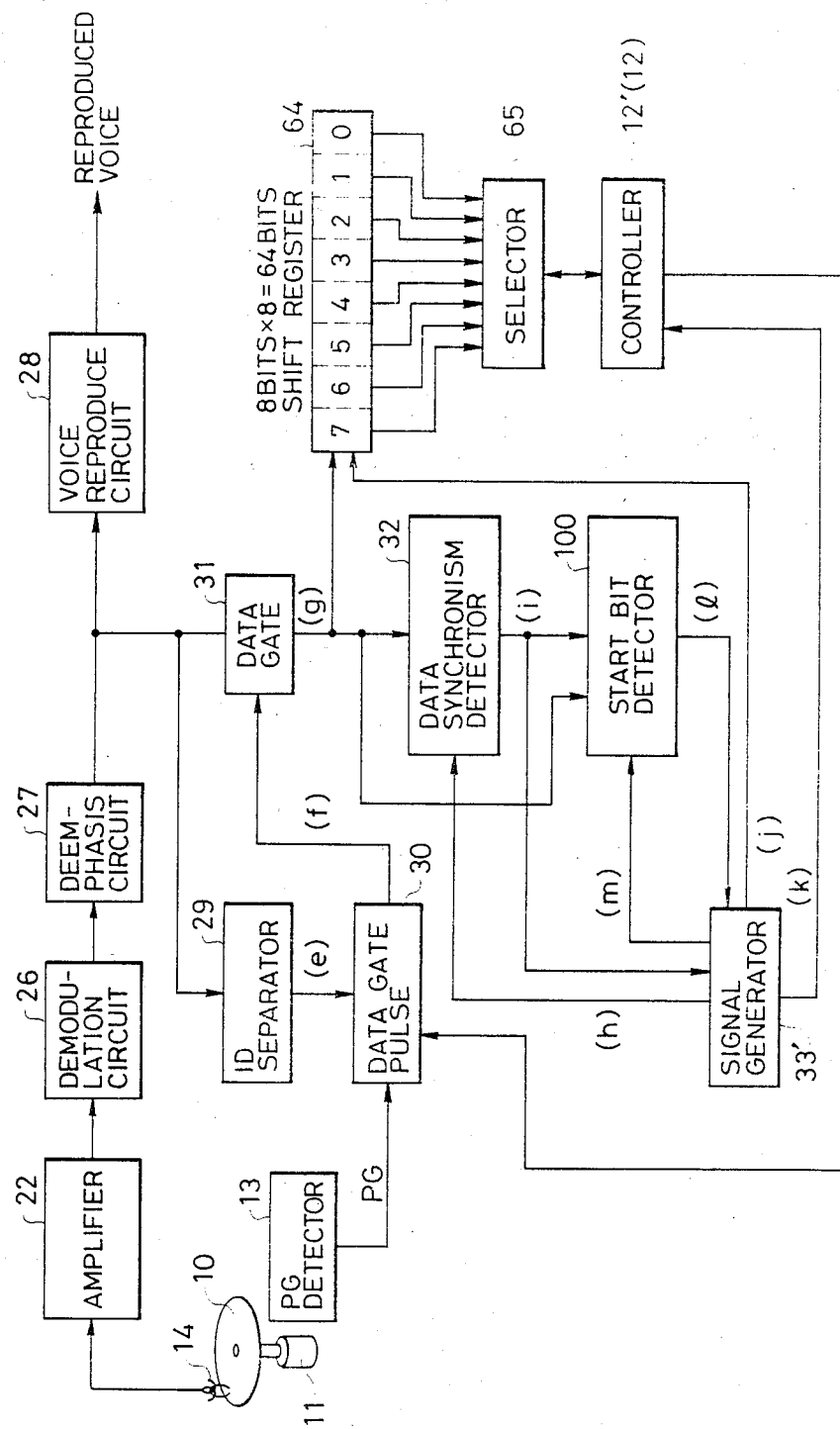
FIG. 11 is a block diagram showing one embodiment of a reproduction system to reproduce the data signal shown in FIG. 9.

One example of a circuit to reproduce the signals recorded in the above manner will be described with respect to FIG. 11. Note that in FIG. 11 the same reference numeral as that in FIG. 6 denotes an element similar to that of FIG. 6 and that in FIG. 11 the same reference numeral as that in FIG. 6 but having a prime denotes an element corresponding to that of FIG. 6. In this embodiment, in order to correspond to the signal format of FIG. 9, a start bit detector 100 is provided between data synchronism detector 32 and signal generator 33'. Signal generator 33' is arranged to be reset by the output from start bit detector 100.

Figure 6:
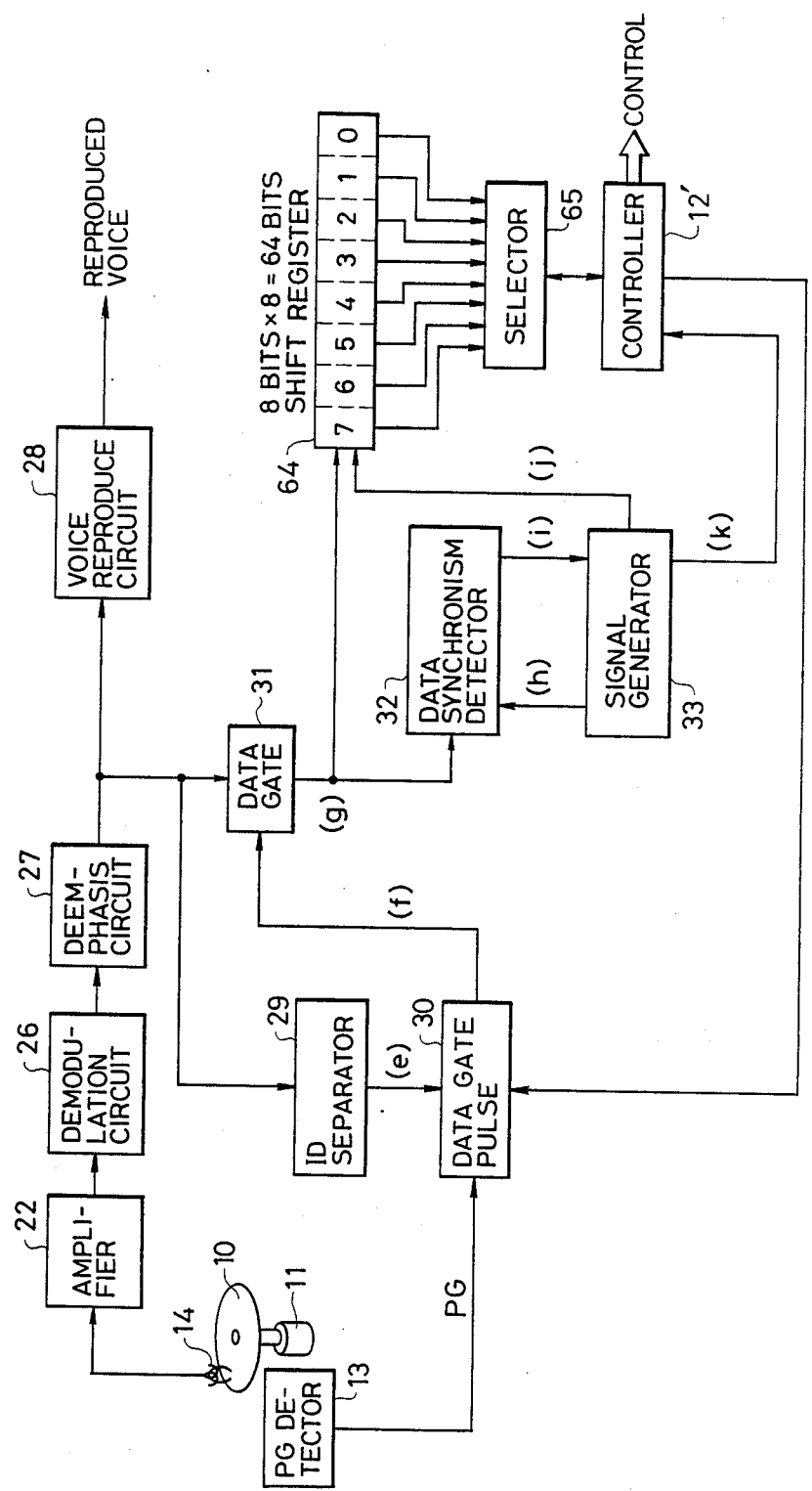
FIG. 6 is a block diagram of one example of a reproduction system to reproduce the data signal of FIG. 4.

In the illustrated structure, the processes up to separation of the data signal (g) by data gate 31 is quite the same as with FIG. 6.

The data signal (g) separated by data gate 31 is delivered to shift register 64, data synchronism detector 32 and start bit detector 100. At this time, a clock signal (h) (for example, of 3 fsc Hz, assuming that the data bit rate is fsc/2 BPS) generated by signal generator 33' is applied to detector 32.

On the other hand, start bit detector 100 and signal generator 33' is impressed with the data synchronism detection output (i), as a control signal, indicative of data synchronism detection (for example, a pulse output maintained high for a predetermined interval in response to the trailing edge of the last bit "1" of the "01010101" when the last bit "1" is detected) from data synchronism detector 32.

Start bit detector 100 includes a flip-flop, a logic gate, etc., as will be described later. It responds to the output (i) of data synchronism detector 32 to detect the inverting edge between the start bit of the data signal (g) from data gate 31 and the following head bit of the 8-bit data bits. Upon detecting of the inverting edge, detector 100 produces a pulse (l) which is delivered to signal generator 33' thereby to reset a divide by 6 counter which produces a write clock pulses to shift register 64. On the other hand, each time signal generator 33', after reset, produces 9 write clock pulses (j) to shift register 64, i.e. one-frame processing has ended, it produces a pulse (m), synchronous with the leading edge of the start bit, to start bit detector 100 thereby to cause same to repeat detection of the inverting edge. Note that in this case, signal generator 33' interrupts the write clock pulses (j) to shift register 64 at the timing corresponding to the head of the data frame, i.e. the start bit.

Thus signal generator 33' produces a write clock pulse (j) synchronous with the inverting edge between the start bit and the following head of the data and hence the start bit thereby to permit data to be written into shift register 64 correctly.

When the writing of all the data for 8 frames into shift register 64 (however, the net data for 8 bytes excluding the start bits) has ended, signal generator 33' outputs a data end signal (k) in the same way as is described above. In response to this signal (k), controller 12' (12) processes data via selector 65.

Figure 12:
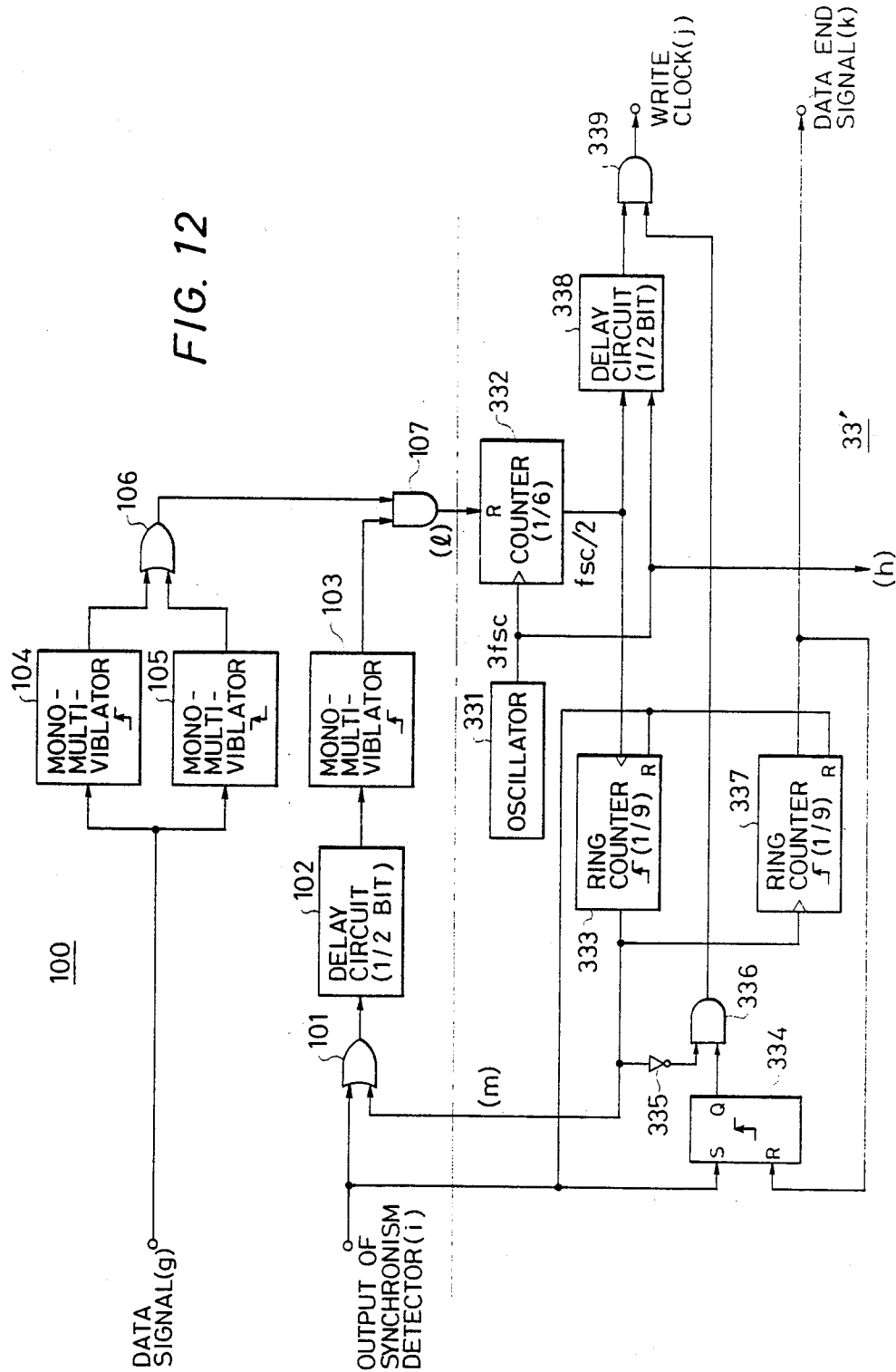
FIG. 12 is a block diagram of a specific structure of the start bit detection circuit and signal generator of FIG. 11.

FIG. 12 shows one embodiment of the start bit detector 100 and signal generator 33'.

In signal generator 33', an oscillator 331 generates a basic clock signal of 3 fsc (hz) which is divided by a divide by 6 counter 332 into a data writing reference clock signal (FIG. 13(I)). The outputs of counter 332 are delayed by ½ data bit by a timing adjusting delay circuit 338 so that the data detection points (writing points) are at the respective central positions of data bits (FIG. 13(J)). The delayed counter outputs are then delivered as writing clock pulses to AND gate 339.

On the other hand, the output of the counter 332 is delivered to a divide by 9 ring counter 333 which then outputs one pulse (FIG. 13(C)) in response to every ninth output pulse from counter 332. The output of counter 333 is delivered to start bit detector 100, to one input of AND gate 336 via inverter 335, and further to a divide by 9 ring counter 337. Ring counter 337 counts 9 output pulses from counter 333 and outputs one pulse. Ring counters 333, 337 are reset by the synchronous detection output (i) (FIG. 13(K)) from data synchronism detector 32. The detection output (i) is input via flip-flop 334 to the other input of AND gate 336, the output (FIG. 13(M)) of which is applied as a write clock pulse (j) to shift register 64.

In start bit detector 100, OR gate 101 receives the synchronism detection output (i) (FIG. 13(B)) and the output (FIG. 13(C)) from data synchronism detector 32 and counter 333, respectively. The output of OR gate 101 is delayed ½ data bits by delay circuit 102 (FIG. 13((D)). As described above, the output (i) of synchronism detector 32 is a signal maintained, for example, high for a predetermined interval (here, 2-bit interval) synchronously with the falling edge of the eighth bit of the 8-bit synchronism signal, as shown in FIG. 13(B). The output of counter 333 is a signal maintained high for just the start bit interval, as shown in FIG. 13(C). It is delayed ½ bits by delay circuit 102 so that the rise edge of the thus delayed counter output coincides with the central position of each bit of the output of counter 333.

The output of delay circuit 102 is delivered to a rise-synchronous mono-multivibrator (any mono-multivibrators used herein are hereinafter referred to as the "MONO-MULTI") 103 which then produces a pulse maintained high for just 1 bit synchronously with the rise of the output of delay circuit 102, as shown in FIG. 13(E). The output pulse from MONO-MULTI 103 is delivered to AND gate 107. On the other hand, the data output signal (g) (FIG. 13(A)) from data gate 31 is delivered simultaneously to a rise-synchronous MONO-MULTI 104 and a fall-synchronous MONO-MULTI 105. MONO-MULTIs 104 and 105 produce a pulse synchronous with the rise of each bit of the incoming signal (g) and a pulse synchronous with the fall of each bit of the signal (g), respectively, (FIGS. 13(F) and (G)), each such pulse having a width narrow enough compared with the 1-bit interval of the incoming data signal (g). These pulses are input to the other input of AND gate 107 via OR gate 106. Thus the output of AND gate 107 is a narrow pulse synchronous with the inverting edge between the start bit and the directly following head bit of the data, as shown in FIG. 13(H). This narrow pulse is applied as the start bit detection pulse (l) to signal generator 33'.

In the signal generator 33', the write clock generating counter 332 is reset by the rise of the start bit detection pulse (l) (FIG. 13(H)) and hence counter 332 is reset by each inverting edge between the associated start bit and the directly following head bit of the data, and the write clock (j) is synchronized with the inverting edge.

In the above, counter 332 outputs a pulse when it is reset and thereafter each time it receives 6 pulses from oscillator 331, the pulse output being in synchronous with the leading edge of each data bit. Thus in order to obtain the write clock signal (j) coincident with the central position of each data bit, the output of counter 332 is delayed ½ bits by delay circuit 338 using a 3 fsc clock signal from oscillator 331. Counter 333 is provided to know the head or start bit of each frame (consisting of 9 bits) of the 8-frame data signal following the 8-bit synchronism signal. Inverter 335, and AND gates 336, 339 are provided to interrupt the write clock signal (j) at that start bit (see FIG. 13(C), (L),(M)). Counter 337 is provided to know the end of the eighth frame since the number of data frames is 8, and the output of the counter 337 is delivered as the data end signal (k) to controller 12 (12'). Flip-flop 334 is provided to know the second to ninth frame data intervals following the synchronism signal out of the 9-frame data signal, inclusive of the synchronism signal (see FIG. 13(K)).

The synchronism detector 32 is composed of a shift register 27 which stores the latest 8-bit data of a data signal input thereto via data gate 31, and a one-shot multivibrator which is maintained high for a fixed time duration in response to the output of a digital comparator which compares the output of shift register 27 and the synchronism signal pattern "01010101".

Figure 14:
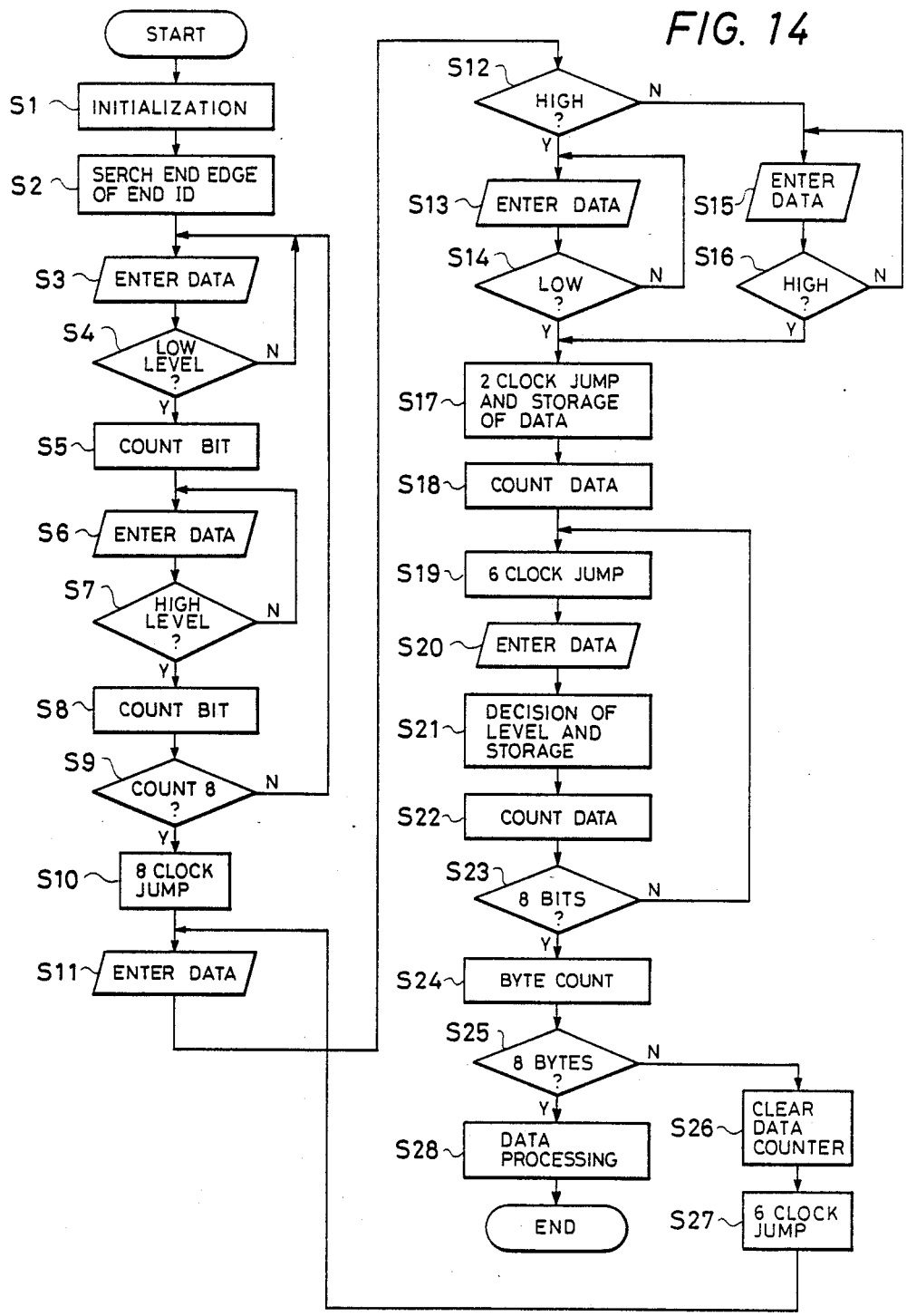
FIG. 14 is a flowchart showing the operation for reproducing the data signal shown in FIG. 9 using a microcomputer.

FIG. 14 shows the flow of the operations carried out for reading the above-mentioned data using a microcomputer.

First, the registers and counters are initialized (step 1). The end edge of the end ID signal is searched to predict the position where the data signal is recorded (step 2). The data is then entered to search the synchronism bits (step 3). It is then determined whether the data level is low or not because the first one of the synchronism bits is at low level (step 4). Data is entered sequentially and the determination i repeated until the low level input is ascertained.

When low level data has been entered, it is counted by a bit counter (step 5). Subsequently, data is entered sequentially (step 6). It is determined whether or not the data is at high level since the second one of the synchronism bits is at high level (step 7). Data entering and determination are repeated until high-level data bit is entered.

When high-level data has been entered, it is counted by a bit counter (step 8). It is determined whether or not all the synchronism bit (8 bits) have been entered and determined (step 9). The steps 3 to 9 are repeated for input data until 8 counts are attained. For bit level sampling, 1 bit corresponds to 6 clock pulses. Level determination of the synchronism bits is performed immediately after the first clock pulse, i.e. the rising or falling edge thereof.

Level determination of the start bit is performed using one clock pulse at a position jumped by 8 clock pulses from the position where the last synchronism bit is determined, i.e. at the central position of the start bit.

Thus data is entered eight clock pulses after determination of all the eight synchronism bits has been completed (step 11). Since the start bit is in inverted relationship to the directly following head bit of the data, level determination is first performed on the assumption that the data level is high (step 12). If the level is not high, the level is low and thus the head bit of the data is high. Thus in order to detect a rising edge from low to high, data is sequentially entered (step 15) and level determination is performed (step 17). Steps 15 and 16 are repeated until high level is detected.

The position where the data level is determined high at step 16 is directly after the low-to-high rising edge. Jump is performed by two clock pulses on the basis of the low-to-high edge change, the level is read at the central position of the head bit of the data and the level value is stored (step 17). That is, a high-level value is stored as the data.

If the level is determined high at step 12, the data head bit level will be low. Thus in order to find a high-to-low falling edge, data is sequentially entered (step 13) and it is determinated whether or not the level is low (step 14). Steps 13 and 14 are repeated until low level is detected When the level has been determined low at step 14, this means that the high-to-low falling edge has been detected. Thus jump is performed by 2 clock pulses on the basis of the position of the falling edge, the level of the head bit of the data is read and the read level value is stored; i.e., the low-level value is stored as the data (step 17). A data counter is caused to count data synchronously with the rising edge or the falling edge between the start bit and the data head bit (step 18). Jump is then performed by a total of 6 clock pulses consisting of the remain 3 clock pulses for the head bit and the former 3 clock pulses for the first bit of the next data in order to shift the position where the data level is read from the center of the data head bit to the central position of the next data bit (step 19).

Since the position where the data is read is brought to the central position of the data bit by step 19, that data level is entered (step 20), level determination is performed and the level value is stored (step 21). When the data has been stored, the data counter is caused to count one (step 22). It is determined whether or not 8 data bits have been read, inclusive of the head bit of the data (step 23). If the 8 bits have not been read yet, control passes to step 19 where jump is performed to the central position of the next data bit and data is entered again. When the central position of the data bit is read by 6-clock pulse jump on the basis of the start bit, a clock deviation such as jitter is 2%. If the number of data is 8 bits or so, no clock deviations will occur and correct jump to the central position of the data bit can be attained at all times. When the reading of the 8-bit data has been completed, byte counting is performed by one (step 24). If the 8-byte counting has not been completed, the data counter is cleared (step 26). Six-clock pulse jump is then performed to shift to the central position of the start bit of the next byte (step 27). Steps 11 to 25 are repeated to read respective data at their start bits. When the reading of the 8-byte data has been completed, the stored data is processed (step 29), thereby ending the flow. In the manner mentioned above, data can be correctly read at all times on the basis of the inverting edge between the start bit and the head bit of the data. Provision of counters eliminates the need of the stop bit.

Briefly, the above embodiment eliminates the stop bit and uses only the start bit in the signal arrangement of FIG. 8. In a modification, in reverse, it may be arranged that the start bit is eliminated and only the stop bit is used. In this case, in the same way as is mentioned above, dummy bit is provided as the stop bit after the last bit of the 8-bit serial data with the dummy bit being in inverted relationship to the last bit. The inverting edge between the dummy bit and the last bit is used to set the timing of detecting each bit data of the subsequent data frame. More specifically, the inverting edge obtained at frame 1 is used at frame 2, the inverting edge obtained at frame 2 is used at frame 3, etc. Of course, in this case, a portion corresponding to the stop bit is removed out of the write clock signal (J) to shift register 64. The timing of detecting each data bit of frame 1 is determined using the synchronism bits.

In the above, description has been made on the assumption that 8-bit data is written in the 8 bit positions of each of data frames 2–9 subsequent to the start bit of that frame. However, when data is not written in all the 8 bit positions, for example, in the case of 6-bit or 4-bit data, the data may be put close to the left or right in each frame, which would facilitate data processing. Especially, putting data close to the right causes the start bit to be at high level at all times. Here, whether data has been written in all the bit positions of each frame or not, a start bit is placed at the beginning of each frame. Thus in the case of putting data close to the right, no data is written in the head bit position directly following the start bit. Thus, the head bit of data may be significant or insignificant data.

Another embodiment will be described with respect to FIG. 15. This embodiment is concerned with an m×n (m, n are a positive integer and n is equal to or higher than 2)-serial data transmission system which transmits the serial data with the last bit data of each nth byte of the serial data being in inverted relationship to the bit data directly before or after the said last bit data and with an error detecting data of not more than n bytes at the end of the data train.

Figure 4:
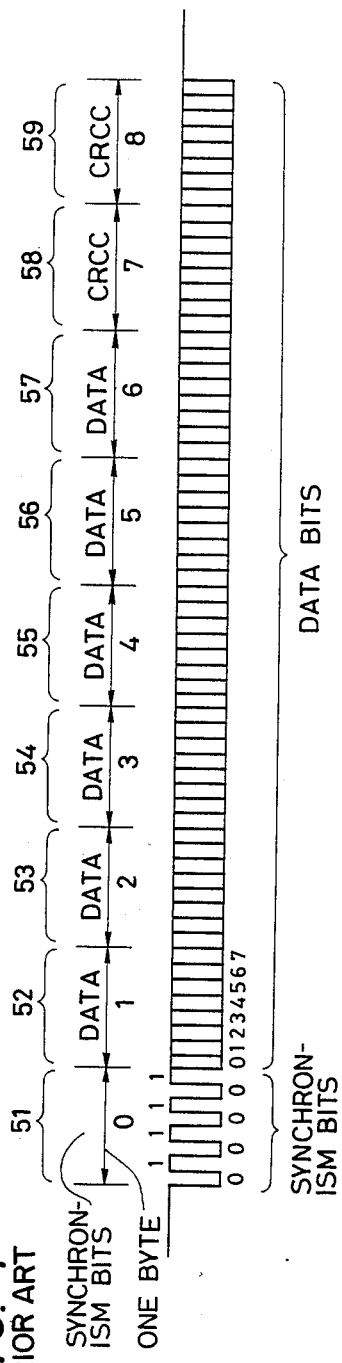
FIG. 4 illustrates the details of the format of the data signal of FIG. 3.
Figure 15:
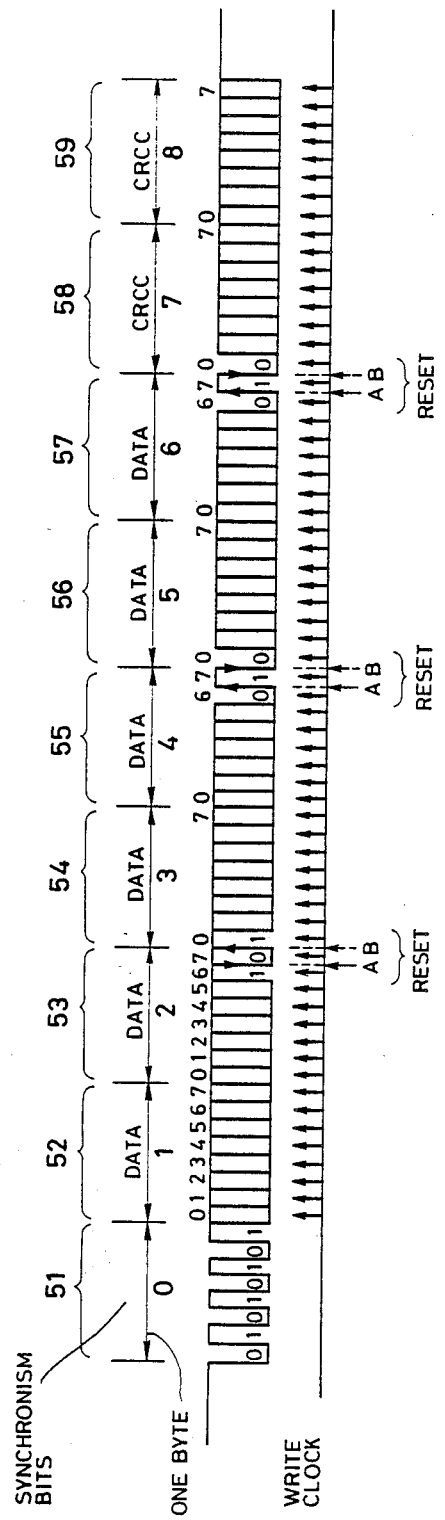
FIG. 15 illustrates one example of the format of the data signal used in another embodiment of the present invention applied to the recording and reproduction of the audio and data signals described in FIGS. 1 to 4.

FIG. 15 shows the format of a data signal used in such embodiment. Here, the data train including 6 bytes 52–57 shown in FIG. 4 are divided into 3 groups, each including 2 data bytes. That is, m=3 and n=2. The last bit (bit 7) data of each of the second bytes 53, 55 and 57 of the respective groups is in inverted relationship to the bit data (bit 6) directly before the said last bit data; for example, when the bit 6 data is "1", the bit 7 data is "0" or otherwise when the bit 6 data is "0", the bit 7 data is "1" so that an inverting edge A is formed between these adjacent bits. Thus in this case, a maximum of 7 data bits can be accommodated in each of bytes 53, 55 and 57. Note that data does not continues to byte 59, i.e., the second byte of CRCC, so that a rule such as is mentioned above need not be applied to this byte 59.

As in the above embodiment, the inverting edge A is used to reset the data write clock to the shift register during data detection, i.e., to detect the bit data.

Note that m=2 and n=3 may be used instead of m=3 and n=2. This combination is supported by the inventors' experimental results on the error in reading referred to in FIG. 7.

The synchronism bits of byte 51 are used to distinguish a data interval from possible dropout pulses, etc., to know that the data train will begin next and to determine the timing of detecting each bit data of bytes 52 and 53, in the same manner as is described in FIG. 9.

Figure 5:
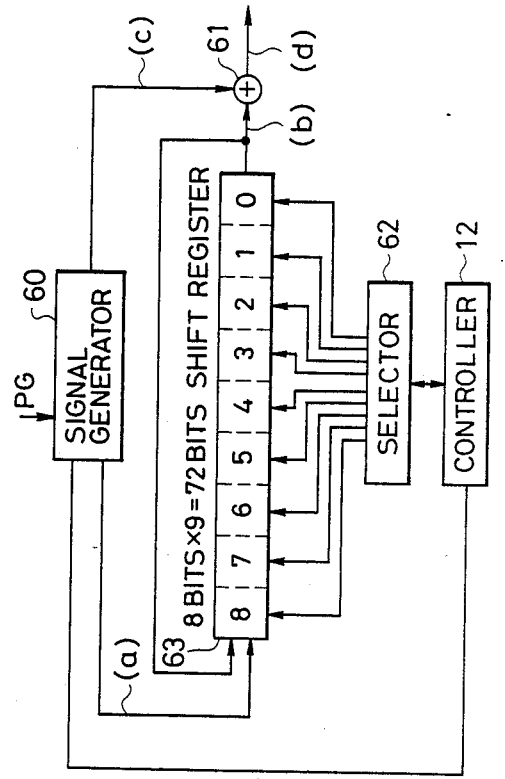
FIG. 5 is a block diagram of a circuit to generate the signal of FIG. 4.

The data signal having the format shown in FIG. 15 can be produced by using the circuit of FIG. 5. That is, in the generation of the data signal of FIG. 4, as mentioned above, the data of bytes 53, 55 and 57 is required to be written from controller 12 to bytes 2, 4 and 6 of shift register 63 with the last bit data of each of the bytes being in inverted relationship to the bit data directly before the last bit data, as mentioned above. Other operations are similar to those described with respect to FIG. 5.

Figure 16:
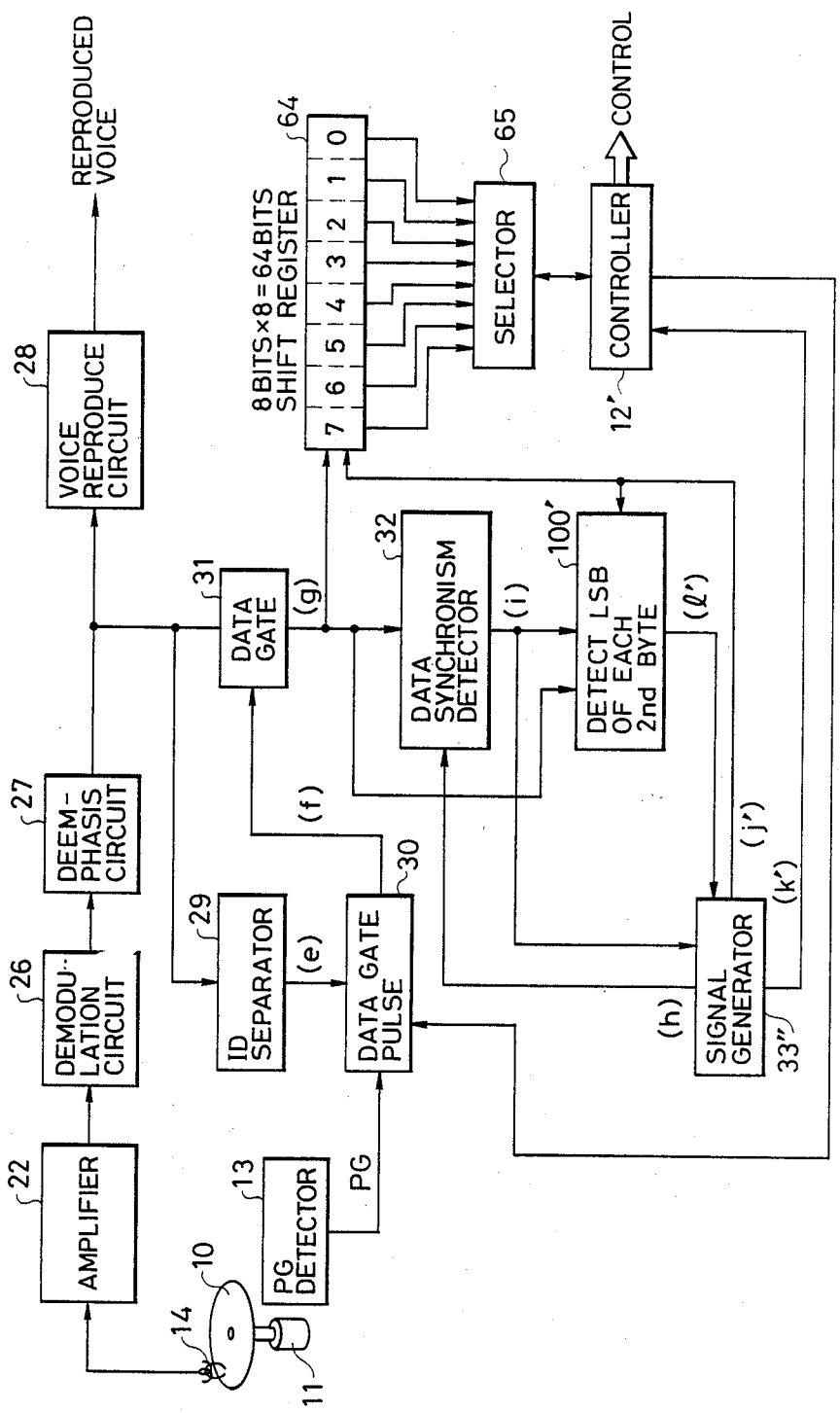
FIG. 16 is a block diagram showing one embodiment of a reproduction system to reproduce the data signal shown in FIG. 15.

One example of a circuit system to reproduce the signal formed as mentioned above and recorded on the magnetic sheet will now be described with respect to FIG. 16. In FIG. 16, the same reference numeral as in FIG. 6 denotes the same element as in FIG. 6. Also, in FIG. 16, the same reference numeral as in FIG. 6 and having a single or double prime denotes an element corresponding to that in FIG. 6. On order to handle the signal format of FIG. 15, the particular embodiment, which is different from the embodiment of FIG. 11, includes a 2nd-byte last or LSB bit detector 100' between data detector 32 and signal generator 33''. This signal generator 33'' will be reset by the output from detector 100'.

The illustrated embodiment of FIG. 16 is quite the same in operation as the embodiment of FIG. 6 up to the separation of data signal (g) by data gate 31.

The data signal (g) separated by data gate 31 is delivered to shift register 64, data synchronism detector 32 and 2nd-byte last-bit detector 100'. At this time, detector 32 is impressed with a clock signal (h) (for example, 3 $f_{sc}$ Hz if the data bit rate is $f_{sc}/2$ BPS generated by signal generator 33'). On the other hand, detector 100' and signal generator 33' are impressed with the data synchronism output (i) indicative of data synchronism detection (for example, a pulse output which becomes high instantaneously in response to the trailing edge of the last bit "1" of "01010101") for controlling purposes.

The last-bit detector 100' detects an inverting edge (i.e., the leading edge of bit 7) between the last bit 7 of every second byte of the data signal (g) from data gate 31 and the bit 6 directly before the last bit 7 in response to the detection output (i) from data synchronism detector 32 and the data write clock signal (j') from signal generator 33''. When the inverting edge has been detected, detector 100' produces a reset pulse (1') which is delivered to signal generator 33'' to reset the divide by 6 counter which produces the write clock signal to shift register 64.

Note that the divide by 6 counter of signal generator 33'' is initially reset by the detection output (i) from data synchronism detector 32.

Thus signal generator 33'' generates a write clock pulse (j') synchronously with the trailing edge of the last one 7 of the synchronism bits and the leading edge of the last bit of every second byte of the data train subsequent to the last bit 7 trailing edge. The write clock pulse (j') causes data to be written correctly into shift register 64.

When the writing of all the data for 8 bytes, inclusive of the CRCC, into shift register 64 has been completed, signal generator 33'' outputs a data end signal (k), in the same way as is mentioned above. In response to this signal, controller 12 processes data via selector 65. However, in this case, arrangement is such that controller 12' ignores the last bit data 7 of each of bytes 2, 4 and 6 of shift register 64 and hence does not handle those last bits as data.

Figure 17:
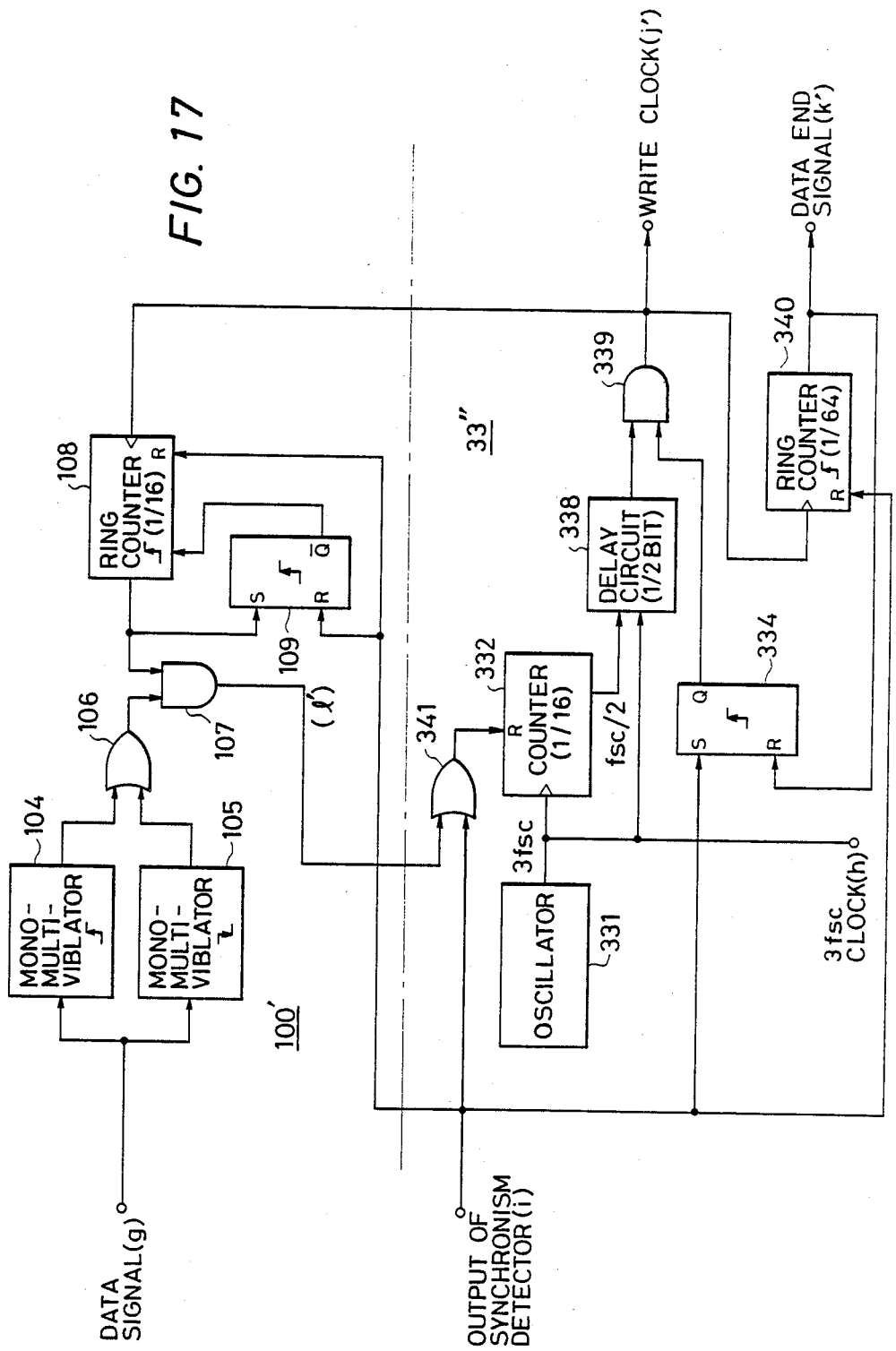
FIG. 17 is a block diagram of a specific structure of the 2nd-byte last bit detector and signal generator of FIG. 16.

FIG. 17 shows one embodiment of the 2nd-byte last-bit detector 100 and signal generator 33''.

In signal generator 33'', oscillator 331 generates a reference clock signal of 3 $f_{sc}$ (Hz) which is divided by a divide by 6 counter 332 into a data write reference clock signal (FIG. 18(I)). In order to set the point of detecting (writing) data at the central position of each data bit, the output of counter 332 is delivered to a timing adjusting delay circuit 338 which then delays the counter output by ½ bits (FIG. 18(J)). This delayed output is then delivered as a write clock signal to one input of an output control AND gate 339.

A divide by 64 ring counter 340 outputs a high-level pulse when it counts 64 output or write clock pulses (j) (for 8 bits×bytes) from AND gate 339. The counter 340 output is delivered as a data end signal (k) to controller 12' and also the reset input of a rise synchronism RS flip-flop 334. The detection output (i) of data synchronism detector 32 is applied to the set input of flip-flop 334, the Q output (FIG. 18(K)) of which is delivered to the other input of AND gate 339. The output (FIG. 18(L)) of AND gate 339 is delivered as a write clock signal (j) to shift register 64.

The output (i) of data synchronism detector 32 which is a signal, for example as shown in FIG. 18(D), becoming high instantaneously in synchronism with the fall or trailing edge of the eighth bit (bit 7) of the 8-bit synchronism signal, is delivered along with the reset pulse (1') from 2nd-byte last-bit detector 100' via an OR gate 341, the output of which is shown in FIG. 18(H), to the reset of counter 332 for resetting same.

In the 2nd-byte last-bit detector 100', as described in FIG. 12, the data signal (g) (FIG. 18(A)) from data gate 31 is delivered simultaneously to rise and fall synchronism mono-multivibrators (hereinafter referred to as the "MONO-MULTI") 104 and 105, respectively, which then produce pulses synchronously with the rise and fall, respectively, of each bit of the incoming data signal (g) (FIGS. 18(B) and (C)), each pulse being enough narrow compared with the 1-bit data duration. These pulses are delivererd via OR gate 106 to one input of AND gate 107. The write clock signal (j') (FIG. 18(L)) from signal generator 33'' is delivered to divide by 16 ring counter 108 which outputs one pulse (FIG. 18(E)) in response to the 15th pulse of the write s clock signal (j') when the $\overline{Q}$ output (FIG. 18(F)) of rise synchronism RS flip-flop 109 is high, or in response to the 16th pulse of the write clock signal when the $\overline{Q}$ output is high. The counter 108 pulse output is delivered to the other input of AND gate 107. Flip-flop 109 is reset by the synchronism detection output (i) (FIG. 18(D)) from detector 32 as well as by the output from ring counter 108. The $\overline{Q}$ output (FIG. 18(F)) of flip-flop 109 is delivered as a frequency divisor switching control signal to counter 108. Counter 108 is reset by the detection output (i) from detector 32.

Thus the output of AND gate 107 is a pulse (FIG. 18(G)) synchronous with the leading edge of the last bit 7 of each second byte of the data train. The pulse is delivered as a reset pulse (1') to signal generator 33''. In signal generator 33", the reset pulse (1') is input via OR gate 341 to the reset input of counter 332 to reset same.

In this way, in signal generator 33", the write clock generating counter 332 is reset by the detection output (i) (FIG. 18(D)) from detector 32 and the rise edge of each reset pulse (1') (FIG. 18(G)) from 2nd-byte last-bit detector 100. Eventually, counter 332 is reset by the trailing edge of bit 7 of the synchronism bits and the leading edge of bit 7 of each second data byte, and the write clock signal (j') is synchronized with these edges.

The counter 332 of signal generator 33" generates a pulse when reset and thereafter each time 6 clock pulses are input from oscillator 331 to the counter 332. Since the counter 332 output pulse is synchronous with the leading edge of each data bit and in order to obtain a write clock pulse (j') coincident with the central position of each data bit on the basis of that output pulse, the output of counter 332 is delayed, for example, ½ bits by delay circuit 338 using the 3 $f_{sc}$ clock signal from oscillator 331. Flip-flop 334 and counter 340 are provided to know the data interval of the 8-byte data signal, inclusive of CRCC, subsequent to the synchronism signal (FIG. 18(K)). In more detail, since the number of data bytes is 8, inclusive of CRCC, counter 340 is provided to know the end of the eighth byte. The output of counter 340 is delivered as the data end signal (k) to controller 12'.

On the other hand, the counter 108 of 2nd-byte last-bit detector 100 is provided to know the last bit 7 of each second byte of the 8-byte data signal, subsequent to the 8-bit synchronism signal, inclusive of CRCC. Thus, here, the bit 6, and, as a result, the leading edge of the data bit 7, of each second data byte are arranged to be detected by a clock pulse signal (FIG. 18(J)) which is obtained by imparting a 2-bit delay to the counter 332 output (FIG. 18(I)) synchronous with the data bit edge, using delay circuit 338.

As described with respect to FIG. 15, since data does not continue to the 8th byte of the 8-byte data, inclusive of byte 59, i.e., CRCC, it is unnecessary to define an inverting edge between bits 6 and 7 of byte 59. Thus if there is an inverting edge between bits 6 and 7 of byte 59, the last-bit detector 100 will output a reset pulse (1') in response to the inverting edge. However, if no inverting edge, it will output no reset pulse (1'). It will be obvious that this is not at all deleterious to the 8th byte if it is considered that data does not continue to the 8th byte.

In the above embodiment, it is arranged that an inversion, as shown by A in FIG. 15, occurs necessarily between the last bit 7 of each second byte of a data train and the bit 6 directly before the last bit 7 and that counter 332 of signal generator 33" of FIG. 17 is reset using the inverting edge A. Alternatively, for example, as shown by B in FIG. 15, the last bit 7 of the second byte of each of a data train may be defined relative to the directly following bit, i.e., the directly following head bit 0 of the data byte such that an invertion occurs necessarily between the last bit 7 and the directly following head bit 0 and that counter 332 of signal generator 33" is reset using the inverting edge in a manner similar to that mentioned above. This may be realized solely, for example, by using the 2nd-byte last-bit detector 100' of FIG. 17 with flip-flop 109 being removed therefrom and with counter 108 operating in a divide by 16 mode at all times.

Therefore, according to this modification, the structure of the detector 100' is further simplified (no flip-flop is needed) compared with the above embodiments. In addition, since the resetting of counter 332 is performed ½ bits (in the above embodiment, 1 and ½ bits) before the first data bit, i.e., bit 0, is detected, it is ensured that data is detected reliably throughout all the 2-byte bits from beginning to end.

For the data train of FIG. 15, it has been described that 8-bit significant data is written in each of bytes 52, 54 and 56 and that 7-bit significant data has been written in each of bytes 53, 55 and 57 at each bit 7 location thereof Where data is not written effectively in all of these data bits locations, for example, where 6-bit or 4-bit data is written, data may be put close to the left (to the side of bit 0) or to the right (to the side of bit 7). This would expedite data processing. Especially, if the former is applied in the previous embodiments, and if the latter is applied in the modification, the bit 7 of each second byte will be at high level at all times. That is, here, whether data is effectively written in all of the data bit locations or not, the last bit 7 of each second byte is in inverting relationship to the bit 6 directly before the bit 7 or to the bit 0 directly after the bit 7.

In the above embodiments, inclusive of its modification, bit data can be detected at all times at substantially the center of the bit in spite of possible fluctuation of the data bit rate due to jitter, etc. A bit utilization measure is good for detection synchronism stipulation. In addition, since data can be handled in units of 1 byte = 8 bits, the present invention is applicable satisfactorily to a circuit using a conventional 8-bit microcomputer.

Note that the data signal may be placed directly after the start ID signal instead of after the end ID signal. According to this method, data signal can be accessed very rapidly for reproduction of the recorded signal (for example, in a time base extension memory used during reproduction), audio can be rapidly reproduced satisfactorily using data signal. Especially, while, as mentioned above, the position of the end ID signal varies according to the length of the audio signal before the end ID signal, the position of the start ID signal is constant in the respective sectors. Therefore, the detection of the data signal is very easy. Alternatively, for example, if two memories each having a capacity for one sector are used, one for an even sector and the other for an odd sector, and the signals stored in the memories are read alternately in units of a sector and recorded on a magnetic sheet, no data signals are superimposed on the magnetic sheet and damaged and good recording can be performed in spite of a slight change in the timing of switching the memories.

While the embodiment in which the present invention has been applied to recording and reproducing a data signal as the additional signal to the audio signal has been shown and described, it goes without saying that the present invention is not limited to such recording and reproduction alone, as pointed out above. Especially, the present invention is also effective in transmission and detection of a data signal including discrete data signal blocks.

As described above in detail, according to the present invention, improved data transmission and detection systems in which each bit data of the data signal can be detected correctly in spite of possible fluctuations in the data bit rate, data can be handled in units of a byte with low redundancy and hence high utilization measure of bits.

What is claimed is:
1. A data transmission system comprising:

(a) a first of dividing serial data of bits; and
(b) a second step of transmitting said divided data with a dummy bit before a head bit of each divided data, said dummy bit being in inverted relationship to said head bit regardless of a value of said head bit, wherein for at least one of said divided data only the dummy bit is provided.

2. A data transmission system of claim 1, wherein said serial data is represented by an NRZ code.

3. A data transmission system of claim 1, wherein said serial data of bits is divided 8 bits by 8 bits.

4. A data transmission system of claim 1, further including:
(c) a third step, subsequent to said second step, of transmitting an error detecting data for said serial data subsequent to said serial data of bits.

5. A data transmission system of claim 1, further including:
(d) a fourth step, performed before said second step, of transmitting synchronism data before said serial data is transmitted.

6. A data transmission system of claim 5, wherein said serial data is divided 8 bits by 8 bits and wherein said synchronism data includes 8 bits.

7. A data transmission apparatus for transmitting data of bits, comprising:
(a) means for dividing said data of bits into data units of a predetermined number of bits; and
(b) means for providing a dummy bit before a head bit of each of said divided data units, said dummy bit being in inverted relationship to said head bit regardless of a value of said head bit,
wherein for at least one of said divided data only the dummy bit is provided.

8. A data transmission apparatus of claim 7, wherein said serial data is represented by an NRZ code.

9. A data transmission apparatus of claim 7, wherein said predetermined number of bits is 8.

10. A data transmission apparatus of claim 7, further including:
(c) means for providing error detecting data to said data.

11. A data transmission apparatus of claim 7, further including:
(d) means for providing a synchronism signal at the head of said data.

12. A data transmission apparatus of claim 11, wherein said data of bits are divided 8 bits by 8 bits and wherein said synchronism signal includes 8 bits.

13. A transmission system which transmits a data signal to reproduce an audio signal compressed at a predetermined compression ratio, comprising:
(a) means for dividing said data signal into a predetermined number of data units; and
(b) means for providing a dummy bit before a head bit of each of said data units divided by said dividing means, said dummy bit being in inverted relationship to said head bit regardless of a value of said head bit,
wherein for at least one of said divided data only the dummy bit is provided.

14. A transmission system of claim 13, wherein said data signal is represented by an NRZ signal.

15. A transmission system of claim 13, wherein said data signal includes serial data of bits which is divided into a plurality of data units of 8 bits.

16. A transmission system of claim 13, further including:
(c) means for providing error detection data to said data signal.

17. A transmission system of claim 13, further including:
(d) means for providing a synchronism signal at the head of said data signal.

18. A transmission system of claim 17, wherein said data signal includes serial data of bits which is divided into a plurality of data units of 8 bits and wherein said synchronism signal is composed of 8 bits.

19. A transmission system of claim 17, wherein said data signal includes data indicative of said compression ratio.

20. A transmission system of claim 16, wherein said error detection data includes a CRCC.

21. A detection system which detects serial data of bits, comprising:
(a) a first step of detecting an inverting edge between a head bit of said serial data and a dummy bit provided before said head bit, said dummy bit being in inverted relationship to said head bit regardless of a value of said head bit, wherein for at least one said head bit only the dummy bit is provided; and
(b) a second step of detecting said serial data on the basis of said detected inverting edge.

22. A detection system of claim 21, wherein said serial data is represented by an NRZ code.

23. A detection system of claim 21, wherein said dummy bit is provided to every 8 bits of said serial data.

24. A detection system of claim 21, wherein said first step includes the step of resetting a generator which generates a clock signal to detect said inverting edge thereby to read said serial data.

25. A detection system of claim 24, wherein said second step includes the step of reading said serial data synchronously with said clock signal.

26. A detection system of claim 21, wherein said second step includes the step of detecting said serial data at substantially the center of each bit of said data on the basis of said inverting edge.

27. A transmission system for transmission of serial data of bits, characterized by means for providing a dummy bit before a head bit of said serial data, said dummy bit being in inverted relationship to said head bit regardless of a value of said head bit and wherein for at least one said head bit only said dummy bit is provided.

28. A transmission system of claim 27, wherein said serial data is represented by an NRZ code.

29. A transmission system of claim 27, wherein said dummy data is provided one bit to each serial data of 8 bits.

30. A transmission system of claim 27, wherein an error detecting signal for said serial data is transmitted subsequent to said serial data.

31. A detection system for detection of serial data of bits, characterized by the step of detecting said serial data on the basis of an inverting edge provided between the head bit of said serial data of bits and a dummy bit provided before said data head bit, said dummy bit being in inverted relationship to said data head bit regardless of a value of said head bit, wherein for at least one of said head bit only said dummy bit is provided.

32. A detection system of claim 31, wherein said serial data is represented by an NRZ code.

33. A detection system of claim 31, wherein said dummy data is provided one bit to each 8 bits of said serial data.

34. A detection apparatus which detects serial data of bits to reproduce an audio signal compressed with a predetermined compression ratio, comprising:
  (a) first for detecting an inverting edge between the head bit of said serial data and a dummy bit provided before said data head bit, said dummy bit being in inverted relationship to said data head bit regardless of a value of said head bit, wherein for at least one said head bit only said dummy bit is provided; and
  (b) second means for detecting said serial data on the basis of said inverting edge detected by said first means.

35. A detection apparatus of claim 34, wherein said serial data is represented by an NRZ code.

36. A detection apparatus of claim 34, wherein said dummy bit is provided to each 8 bits of said serial data.

37. A detection apparatus of claim 34, wherein said second means includes:
  (a) means for generating a clock signal to read said serial data;
  (b) means for resetting said generating means in response to said inverting edge detected by said first means; and
  (c) means reading said serial data in response to said clock signal.

38. A detection apparatus of claim 37, wherein said generating means includes a generator for generating a clock signal to read said serial data at substantially the center of each bit of said data.

39. A detection apparatus of claim 37, wherein said first means includes means for detecting a synchronism signal provided before said dummy bit and detecting said inverting edge when said synchronism signal is detected.

40. A detection apparatus of claim 39, wherein said dummy bit is provided one bit to each 8 bits of said serial data and wherein said synchronism signal is of 8 bits.

41. A recording medium on which an audio signal compressed in time base with a predetermined compression ratio is recorded together with a data signal to reproduce the audio signal in a block defined by a start signal and an end signal;
  wherein said data signal is composed of serial data of bits and wherein a dummy bit is provided before the head bit of said serial data, said dummy bit being in inverted relationship to said data head bit regardless of a value of said head bit and wherein for at least one said head bit only said dummy bit is provided.

42. A recording medium of claim 41, wherein said recording medium includes a disk-like one.

43. A recording medium of claim 41, wherein said recording medium includes a magnetic recording medium.

44. A recording medium of claim 41, wherein said data signal includes said compression ratio.

45. A recording medium of claim 42, wherein said recording medium includes concentric track formed thereon, each including four said blocks.

* * * * *